A. J. CURLEE.
IMPREGNATOR.
APPLICATION FILED MAY 14, 1912.
1,052,895.
Patented Feb. 11, 1913.
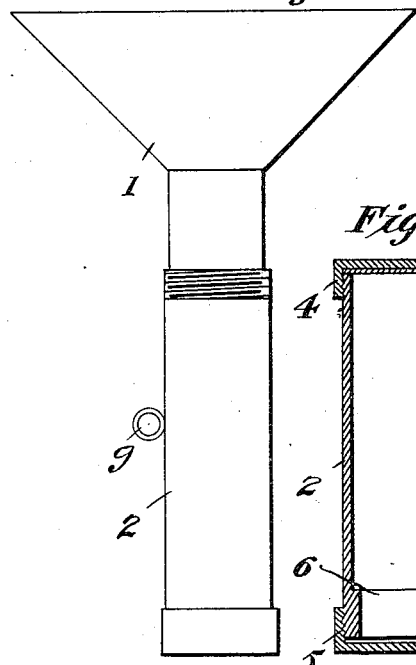
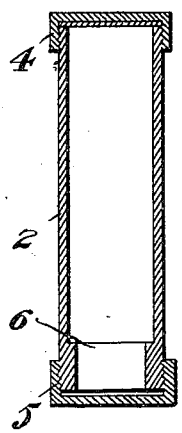
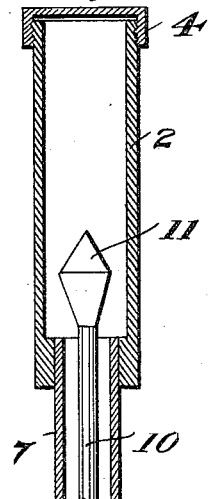
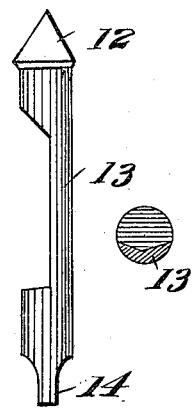
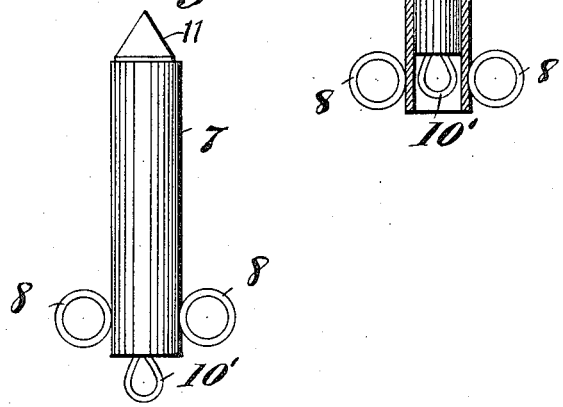
Inventor,
A. J. Curlee,
By A. L. Jackson
Attorney
Witnesses

UNITED STATES PATENT OFFICE.

ANDREW J. CURLEE, OF WAXAHACHIE, TEXAS.

IMPREGNATOR.

1,052,895. Specification of Letters Patent. Patented Feb. 11, 1913.

Application filed May 14, 1912. Serial No. 697,160.

*To all whom it may concern:*

Be it known that I, ANDREW J. CURLEE, a citizen of the United States, residing at Waxahachie, in the county of Ellis and State of Texas, have invented certain new and useful Improvements in Impregnators, of which the following is a specification.

My invention relates to impregnators for mares and the object is to provide simple and highly efficient devices for gathering and preserving semen and impregnating mares with the same without the service of a stud at all.

Another object is to provide the device with a dilator so that in case a mare's womb is closed it may be dilated for the purpose of inserting semen.

Other objects and advantages will be fully explained in the following description and the invention will be more particularly pointed out in the claim.

Reference is had to the accompanying drawings which form a part of this application.

Figure 1 is a side elevation of the devices for gathering the semen. Fig. 2 is a vertical section of the preserver. Fig. 3 is a vertical section of the preserver and a section of the impregnator casing with the dilator in position to receive a charge. Fig. 4 is a side elevation of the impregnator as it appears when ready for service. Fig. 5 is a side elevation of a dilator which is a variation from the dilator previously shown.

Similar characters of reference are used to indicate the same parts throughout the several views.

A funnel-shaped collector 1 is used to collect semen into the preserver 2 where the semen can be protected from light. When the preserver is not in use for charging the impregnator, it is kept in a dark place and at the proper temperature. The preserver 2 has caps 4 and 5 for closing the ends thereof and at the charging end it has a discharge opening which is smaller than the opening through the body thereof, forming an off-set which holds the impregnator casing 7, while the impregnator is being charged with semen. The impregnator consists of a casing 7 and a plunger and a dilator combined. The dilator 11 is cone-shaped for easy entry into the womb. The dilator 11 is connected to the plunger 15 by a neck or reduced portion 10 and the plunger is provided with a handle 10'. The casing 7 is provided with handles 8 and preserver 2 is provided with a handle or hanging device 9.

In the variation shown in Fig. 5, there is a neck 13 which connects the dilator 12 with the plunger and the plunger is provided with a handle 14. There is one advantage in the form shown in Fig. 5, and that is, the semen will always be in one body or all together. In the form shown in Fig. 3, the semen is liable to flow on both sides of the neck.

In charging the impregnator, the impregnator is shoved into the preserver 2 and the plunger is shoved far enough by means of the handle 10' so that semen will run into the casing 7. The plunger is then drawn back outwardly by the handle 10' so that the casing 7 will be closed by the dilator 11. The dilator should be large enough, slightly larger than the mouth of the casing 7, to close the casing securely. The mare is then impregnated by inserting the end of the impregnator into the mare's womb and then shoving the plunger far enough to discharge the semen from the casing 7.

The semen is usually collected from the vagina of a mare after service by a stud. A part of the semen discharged by a stud is deposited in the vagina and unless it is collected, it is wasted. This waste is collected by the tool or vessel 1 and run into the preserver 2 which is kept in a dark place and at the proper temperature for use with the impregnator above described. It may be necessary to insert the hand or some device in the vagina to rake out the semen. It has been found practical also to remove part of the semen deposited in the womb of the mare for use on other mares. The large amount of semen deposited in the womb is not necessary for foaling and this is frequently used for foaling other mares.

Some mares are barren and the reason of this is that the stud cannot penetrate the womb because it is closed so tight and has such a small outlet. The instrument herein described is used for dilating such wombs. The device is used by holding it in the palm of the hand and inserting the hand into the vagina and then inserting the instrument 7 into the womb up to the handles 8 and holding the instrument by the handles 8 and shoving the dilator by the handle 10' far enough for the semen to run into the womb.

The device can be used also for impregnating cows and other animals and may be used for other purposes, such as treating the vagina or other parts with a medicine.

The entire device shown in Fig. 3 may be connected with the member 1 in the same manner as member 2 is connected to member 1 for gathering a charge of semen. It is understood that the semen can be gathered only after a stud has served a mare.

It is apparent that variations of the several parts can be made without departing from my invention.

What I claim, is,—

A device of the character described comprising a casing for containing a charge and for containing an operating instrument, an operating instrument mounted in said casing and consisting of a plunger and a dilator carried by said plunger, said dilator being larger than the interior of said casing, said operating instrument having provision between said dilator and said plunger for containing a charge in said casing, and handles for said casing and for said plunger.

In testimony whereof, I set my hand in the presence of two witnesses, this 26th day of April, 1912.

ANDREW J. CURLEE.

Witnesses:
E. C. McCartney,
J. T. Spencer.

Copies of this patent may be obtained for five cents each, by addressing the "Commissioner of Patents, Washington, D. C."